(12) United States Patent
Biziitu et al.

(10) Patent No.: US 12,483,134 B2
(45) Date of Patent: Nov. 25, 2025

(54) BUCK CONVERTER CIRCUIT WITH SEAMLESS PWM/PFM TRANSITION

(71) Applicant: Infineon Technologies AG, Neubiberg (DE)

(72) Inventors: Florin Biziitu, Suceava (RO); Ansgar Pottbäcker, Grafing (DE)

(73) Assignee: Infineon Technologies AG, Neubiberg (DE)

( * ) Notice: Subject to any disclaimer, the term of this patent is extended or adjusted under 35 U.S.C. 154(b) by 285 days.

(21) Appl. No.: 18/164,984

(22) Filed: Feb. 6, 2023

(65) Prior Publication Data

US 2023/0261575 A1 Aug. 17, 2023

(30) Foreign Application Priority Data

Feb. 16, 2022 (DE) .......................... 102022103595.6

(51) Int. Cl.
*H02M 3/158* (2006.01)
*H02M 1/00* (2006.01)
*H02M 1/08* (2006.01)
*H02M 3/156* (2006.01)

(52) U.S. Cl.
CPC ......... *H02M 3/158* (2013.01); *H02M 1/0003* (2021.05); *H02M 1/0025* (2021.05); *H02M 1/0032* (2021.05); *H02M 1/08* (2013.01); *H02M 3/156* (2013.01)

(58) Field of Classification Search
CPC .. H02M 3/158; H02M 1/0003; H02M 1/0025; H02M 3/156; H02M 1/0032; H02M 1/0058; H02M 1/088; H02M 1/08
See application file for complete search history.

(56) References Cited

U.S. PATENT DOCUMENTS

| | | | |
|---|---|---|---|
| 9,958,888 B2 | 5/2018 | Wei et al. | |
| 11,177,737 B2 | 11/2021 | Hauke et al. | |
| 2009/0058383 A1* | 3/2009 | Ryoo | H02M 3/156 331/25 |

(Continued)

FOREIGN PATENT DOCUMENTS

| | | |
|---|---|---|
| CN | 101510729 A | 8/2009 |
| CN | 104201744 A | 12/2014 |

(Continued)

*Primary Examiner* — Monica Lewis
*Assistant Examiner* — Jye-June Lee
(74) *Attorney, Agent, or Firm* — Slater Matsil, LLP

(57) ABSTRACT

A DC/DC converter includes a converter stage to receive an input voltage and to provide an output voltage from the input voltage in accordance with a modulated drive signal. The converter stage further provides a feedback voltage representing the output voltage. A controller circuit includes an error amplifier to receive the feedback voltage and a reference voltage and to provide an error signal based on the feedback voltage and the reference voltage. A PWM modulator receives a clock signal and the error signal and generates a modulated signal based on the clock signal and the error signal, and a logic circuit receives the modulated signal and generates the drive signal for the converter stage based on the modulated signal so that the drive signal has the same duty cycle as the modulated signal, when the duty cycle of the modulated signal is not smaller than a minimum duty cycle value.

20 Claims, 4 Drawing Sheets

(56) References Cited

U.S. PATENT DOCUMENTS

| | | | | |
|---|---|---|---|---|
| 2010/0033143 A1* | 2/2010 | Asuncion | ............... | H02M 3/156 |
| | | | | 323/247 |
| 2010/0283442 A1* | 11/2010 | Nakashima | ......... | H02M 3/1588 |
| | | | | 323/283 |
| 2011/0204860 A1* | 8/2011 | Thiele | ................... | H02M 3/156 |
| | | | | 323/271 |
| 2013/0063100 A1* | 3/2013 | Henzler | ............... | H02M 3/156 |
| | | | | 323/234 |
| 2018/0062513 A1* | 3/2018 | Arbetter | ............... | H02M 3/158 |
| 2018/0375434 A1* | 12/2018 | Biziitu | .................. | H02M 3/158 |
| 2019/0319536 A1* | 10/2019 | Hashiguchi | ........... | H02M 3/156 |
| 2021/0083579 A1* | 3/2021 | Hsu | ....................... | H02M 3/158 |

FOREIGN PATENT DOCUMENTS

| | | |
|---|---|---|
| CN | 105207489 A | 8/2017 |
| DE | 102017127263 B4 | 2/2021 |

\* cited by examiner

BUCK CONVERTER CIRCUIT WITH SEAMLESS PWM/PFM TRANSITION

This application claims the benefit of Germany Patent Application No. 102022103595.6, filed on Feb. 16, 2022, which application is hereby incorporated herein by reference.

TECHNICAL FIELD

This disclosure relates to the field of switching converters, in particular to a novel concept for controlling a DC/DC converter.

BACKGROUND

Switching converters such as buck converters are generally used to convert an input voltage to a desired output voltage, wherein, in the case of a buck converter, the output voltage is lower than the input voltage. For example, switching converters may be used in other electronic circuits to generate one or more supply voltages based on an external supply voltage. Switching converters are usually controlled using feedback loops to provide a predefined regulated output voltage or a predefined regulated output current. Switching converters may be part of so-called Switched Mode Power Supplies (SMPS) or may be used in a large variety of other applications.

Switching converters are usually controlled by controlling the switching operation, which may be accomplished by applying different modulation techniques such as Pulse-Width Modulation (PWM) or Pulse-Frequency Modulation (PFM). Dependent on the load current, a PWM controlled switching converter may be operated in Continuous Conduction Mode (CCM) or Discontinuous Conduction Mode (DCM). A special mode of operation is Pulse Skipping, which may be used for relatively low output currents in order to reduce switching losses.

Control circuits that are capable of controlling switching operations within a wide output current/power range usually implement both PWM (with CCM and DCM), as well as PFM operation (including pulse skipping). However, such multi-mode converters are rather complex and may require, for example, sophisticated mode-switch logic, which can be costly (e.g., in terms of required chip area) and may cause undesired latencies that can lead to over- and undershoots in the output voltage. The inventors have identified a need for improvement of present switching converter control concepts.

SUMMARY

The mentioned objective of improving existing switching converter control concepts is achieved by the circuit of claim 1. Various embodiments and further developments are covered by the dependent claims. Accordingly, one embodiment of a DC/DC converter circuit includes a converter stage configured to receive an input voltage and to provide an output voltage from the input voltage in accordance with a modulated drive signal. The converter stage is further configured to provide a feedback voltage representing the output voltage. A controller circuit comprises an error amplifier configured to receive the feedback voltage and a reference voltage and to provide an error signal based on the feedback voltage and the reference voltage. A PWM modulator is configured to receive a clock signal and the error signal and to generate a modulated signal based on the clock signal and the error signal, and a logic circuit is configured to receive the modulated signal and to generate the drive signal for the converter stage based on the modulated signal so that—in each cycle of the clock signal—the drive signal has the same duty cycle as the modulated signal, when the duty cycle of the modulated signal is not smaller than a minimum duty cycle value.

BRIEF DESCRIPTION OF THE DRAWINGS

The invention can be better understood with reference to the following drawings and descriptions. The components in the figures are not necessarily to scale; instead emphasis is placed upon illustrating the principles of the invention. Moreover, in the figures, like reference numerals designate corresponding parts. In the drawings.

DETAILED DESCRIPTION OF ILLUSTRATIVE EMBODIMENTS

Figure 1:
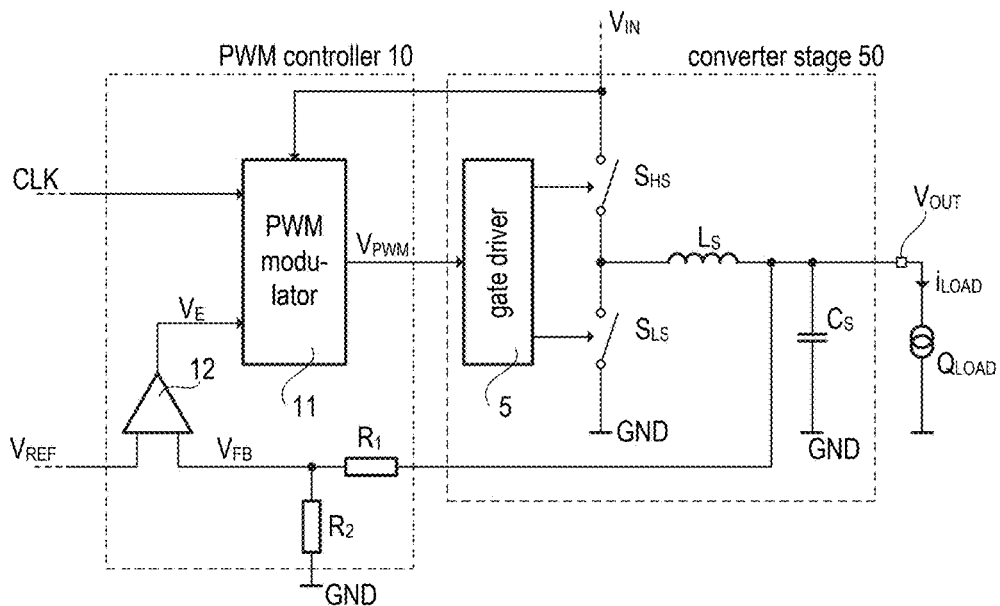
FIG. 1 illustrates an example of a buck converter with PWM and voltage-mode control.

FIG. 1 illustrates an example of a DC/DC converter circuit with PWM and voltage-mode control. The depicted converter circuit is composed of a converter stage 50 and a controller circuit 10. In the present example, the converter stage 50 has a buck converter topology. That is, a half-bridge including two semiconductor switches $S_{HS}$, $S_{LS}$ is connected between a first supply node, at which the input voltage $V_{IN}$ is applied during operation, and a second supply node GND, which may be at ground potential. The semiconductor switches $S_{HS}$ and $S_{LS}$ may be implemented by transistors, e.g., MOS transistors or insulated gate bipolar transistors (IGBTs), or any other type of transistor. The low-side semiconductor switch $S_{LS}$ may alternatively be a diode. The common circuit node between the two semiconductor switches $S_{HS}$ and $S_{LS}$ (half-bridge output) and the converter output terminal, at which the output voltage $V_{OUT}$ is provided, are connected via an inductor $L_S$. An output capacitor $C_S$ is connected between the output terminal and the second supply node GND. In the depicted example, the load connected to the switching converter output is symbolized by a current sink $Q_{LOAD}$, wherein the output current is denoted as $i_{LOAD}$.

The converter stage 50 may include a driver circuit 5, which is configured to switch the semiconductor switches on and off in accordance with an on/off modulated signal $V_{PWM}$, which is a pulse-width modulated (PWM) signal in the present example. In an implementation in which MOSFETs are used as semiconductor switches $S_{HS}$, $S_{LS}$, the driver circuit 5 is usually referred to as gate driver. A converter stage as shown in FIG. 1 is as such known and thus will not be discussed in further detail.

In the present example, the controller circuit 10 includes an error amplifier 12 and a PWM modulator 11, which receives a clock signal CLK that determines the frequency of the PWM signal $V_{PWM}$ supplied to the converter stage 50. The error amplifier 12 receives a reference signal $V_{REF}$, and a feedback-signal $V_{FB}$ that represents the output voltage $V_{OUT}$ of the converter stage 50, and generates an error signal $V_E$, which represents a difference between the feedback signal $V_{FB}$ and the reference signal $V_{REF}$. In the present example, the feedback signal $V_{FB}$ is obtained from the output voltage Vou by scaling down the output voltage $V_{OUT}$ using a voltage divider composed of resistors $R_1$ and $R_2$. In the present example, the scaling factor is $R_2/(R_1+R_2)$. In a steady state, the level of the feedback signal $V_{FB}$ is approximately equal to the level of the reference signal $V_{REF}$ and as a result $V_{OUT} \approx V_{REF} \cdot (R_1+R_2)/R_2$.

A PWM signal can be characterized by its duty cycle DS, which is the ratio between the on-time within a cycle and the cycle time. Thus, the duty cycle can vary between 0 and 1 (or 0% to 100%). The PWM modulator 11 is configured to set the duty cycle DS of the PWM signal $V_{PWM}$ based on the error signal $V_E$. In some embodiments, the level of the input voltage $V_{IN}$ has a direct influence on the duty cycle DS generated by the PWM modulator 11.

Figure 2:
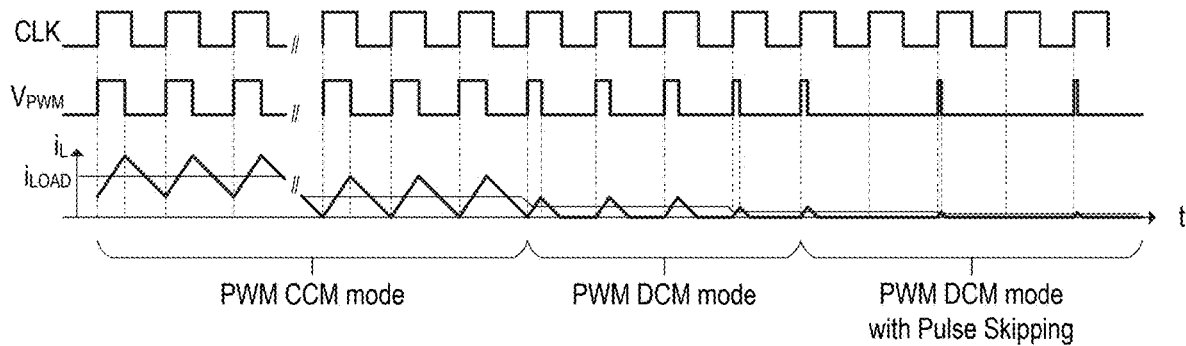
FIG. 2 includes timing diagrams illustrating the function of the circuit of FIG. 1.

The function and different modes of the switching converter is illustrated by the timing diagrams of FIG. 2, which shows (from top to bottom) exemplary waveforms of the clock signal CLK, the PWM signal $V_{PWM}$, the inductor current $i_L$ and the load current $i_{LOAD}$. Also shown in FIG. 2 are the different operating modes of the switching converter, namely PWM Continuous Conduction Mode (CCM), PWM Discontinuous Conduction Mode (DCM), and PWM DCM Pulse Skipping Mode.

In CCM the inductor current $i_L$ does not drop to zero, whereas in DCM the inductor current $i_L$ is zero for a finite time in each PWM switching cycle. The borderline case, in which the inductor current $i_L$ drops to zero exactly at the end of a PWM switching cycle, can also be regarded as CCM and is sometimes referred to as BCM (Boundary Conduction Mode). In CCM, the duty cycle DS of the PWM signal $V_{PWM}$ is equal to the ratio $V_{OUT}/V_{IN}$ in a steady state, in which the output voltage $V_{OUT}$ is at its desired level. Therefore, the duty cycle is basically a function of the input voltage $V_{IN}$. In DCM the load current $i_{LOAD}$ is so small (i.e. below a critical current $i_{CRIT}$) that the inductor current $i_L$ falls to zero and remains zero for some time in each PWM switching cycle. The duty cycle of the PWM signal $V_{PWM}$ is a function of the input voltage $V_{IN}$ and the load current $i_{LOAD}$.

Due to limitations of the slew rate of the semiconductor switches, the pulses in the PWM signal $V_{PWM}$ cannot become arbitrarily small. Moreover, it is not desirable that a very short pulse be generated in each cycle because this would increase the switching losses (in comparison to the output power). Therefore, the PWM modulator 11 is configured to generate pulses with at least a specific minimum pulse length (corresponding to a minimum duty cycle) and to omit pulses in some PWM cycles. Such a concept is referred to as Pulse Skipping and is a special mode of DCM. In the depicted example, each second pulse is skipped in DCM Pulse Skipping mode. However, the number of skipped pulses depends on the load current $i_{LOAD}$, as well as on the input voltage $V_{IN}$. In other words, the PWM modulator transitions from DCM to DCM with Pulse Skipping when the load current falls below a threshold value and the low load current otherwise would require a duty cycle lower than the minimum duty cycle.

Figure 3:
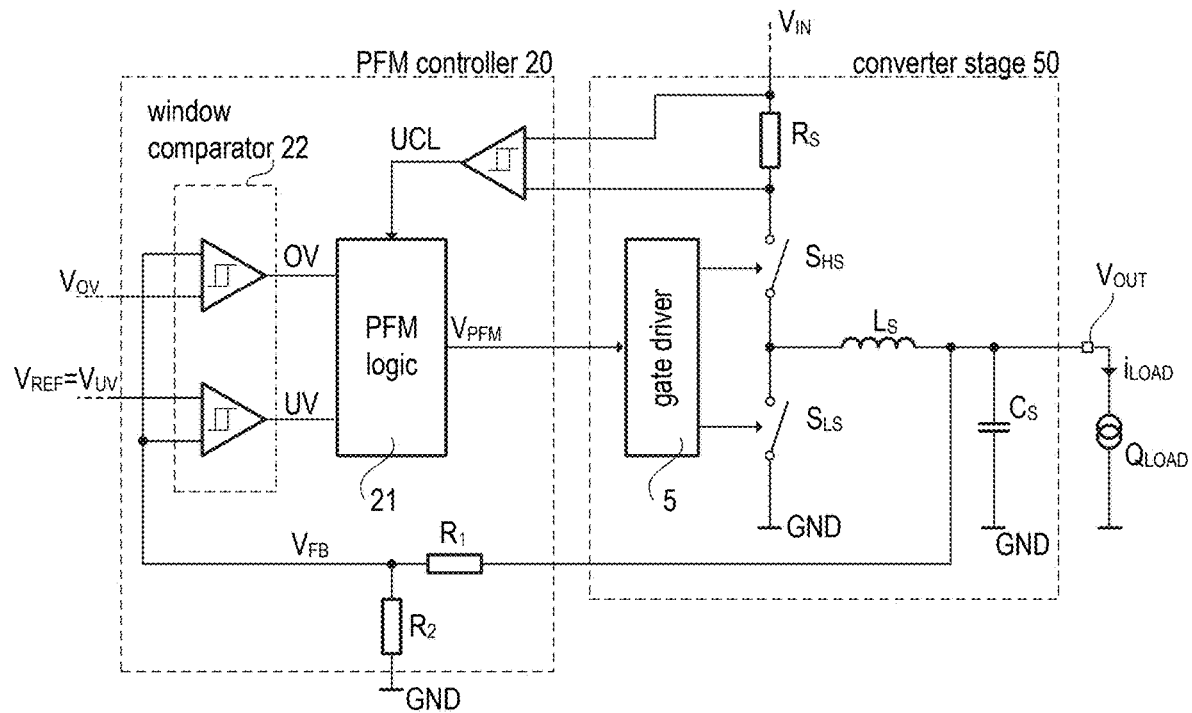
FIG. 3 illustrates an example of a buck converter with PFM and voltage-mode control.
Figure 4:
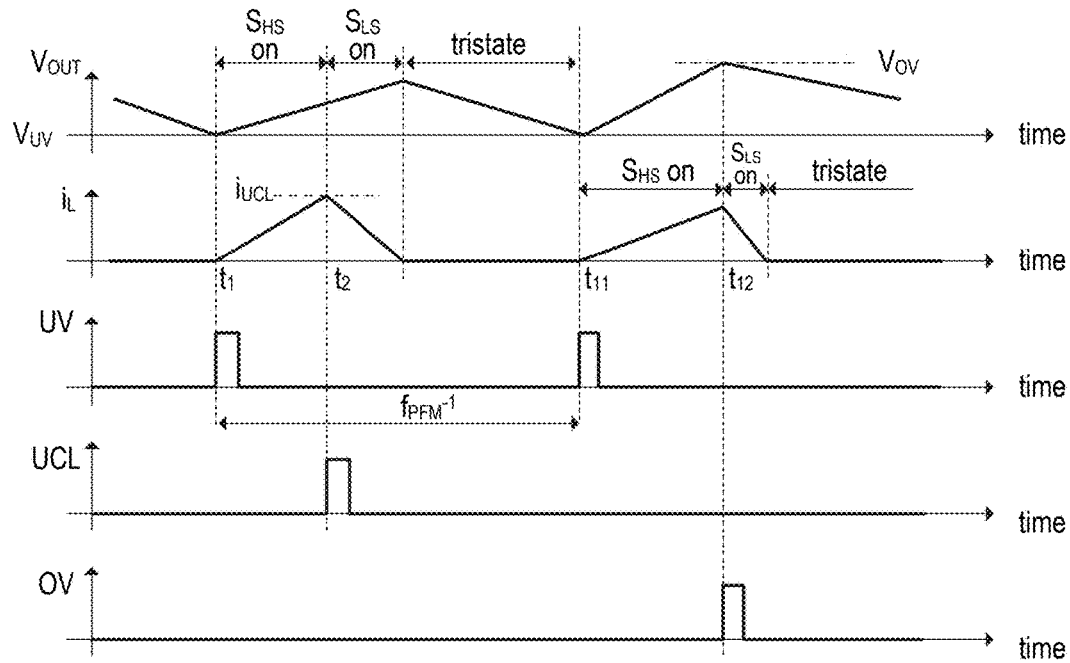
FIG. 4 includes timing diagrams illustrating the function of the circuit of FIG. 3.

Although Pulse Skipping can improve the efficiency of the switching converter for low load currents, there is still room for further improvement, which can be achieved by using Pulse Frequency Modulation (PFM). FIG. 3 illustrates a switching converter with the converter stage 50 and a PFM controller circuit 20. The converter stage 50 is the same as in the previous example of FIG. 1. The functioning of a switching converter operating in PFM mode is further illustrated by the timing diagrams shown in FIG. 4.

The control circuit 20 (PFM controller) uses a feedback signal $V_{FB}$, which represents the output voltage $V_{OUT}$, to control the PFM switching operation. Accordingly, upon detection that the output voltage is about to fall below an under-voltage threshold (condition $V_{FB} \leq V_{UV}$), the PFM control logic 21 is triggered to generate a pulse for the gate driver 2 to switch the high-side switch $S_{HS}$ on. To detect the output voltage falling below the under-voltage threshold, a first comparator may be used, which is configured to compare the feedback voltage $V_{FB}$ with a reference voltage $V_{REF}=V_{UV}$ and to signal the condition $V_{FB} \leq V_{UV}$ to the PFM logic 21 (logic signal UV). Accordingly, the time interval $f_{PFM}^{\beta 1}$—i.e. the period of a PFM cycle—is determined by two subsequent pulses in the UV signal. The reciprocal value of the PFM period denotes the corresponding (variable) instantaneous frequency $f_{PFM}$.

In some PFM controller implementations, the on-time of the high-side-switch $S_{HS}$ is constant. In the present example, an adaptive on-time is used. Accordingly, the pulse length depends on how long it takes for the inductor current $i_L$ to reach a maximum current $i_{UCL}$ (see FIG. 4, time span from $t_1$ to $t_2$). However, the current ramp is stopped (and thus the pulse is shortened) if the output voltage $V_{OUT}$ exceeds an upper threshold $V_{OV}=V_{REF}+\Box V$ (see FIG. 4, time span from $t_{11}$ to $t_{12}$). The gate driver 5 switches on the low-side switch $S_{LS}$ upon switching off the high-side switch $S_{HS}$, wherein both switches are switched off (tristate output of the half-bridge) upon detection that the inductor current $i_L$ has dropped to zero. Concepts for zero current detection are as such known and thus not discussed herein.

Figure 5:
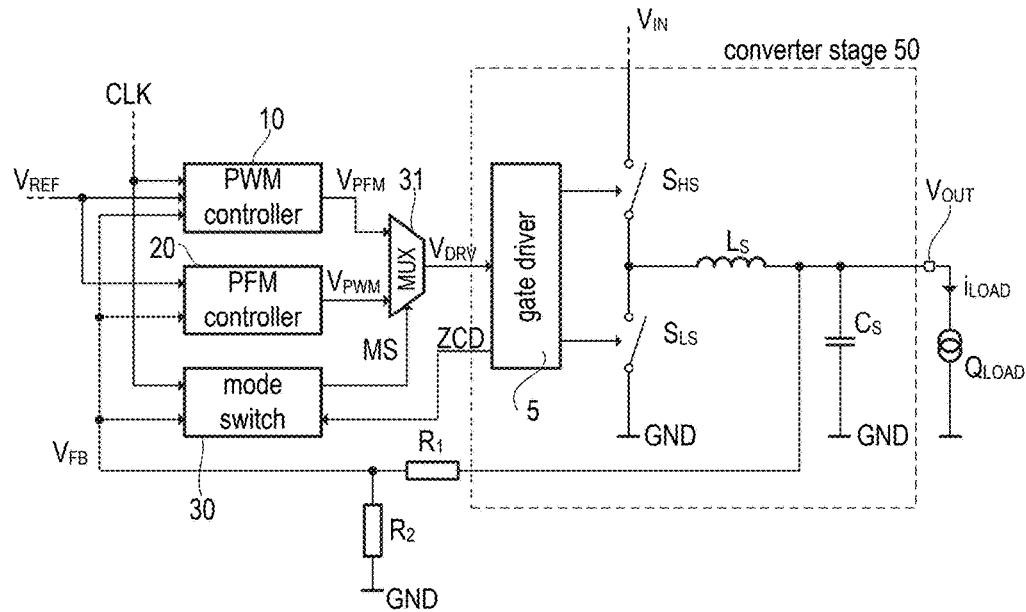
FIG. 5 illustrates an example of a buck converter with a multi-mode controller that includes a mode-switch logic.

In order to obtain the advantages of both PWM and PFM operation, the PWM controller 10 (see FIG. 1) and the PFM controller 20 (see FIG. 2) can be combined into a multimode controller as shown in the example of FIG. 5. It is noted that the converter stage 50 is still the same as in the previous examples. In addition to the combination of the two controllers 10 and 20, a mode switch logic 30 and a multiplexer 31 (to direct either the output of the PWM controller 10 or the PFM controller 20 to the gate drive 5) are needed, which renders the overall controller circuitry even more complex.

Figure 6:
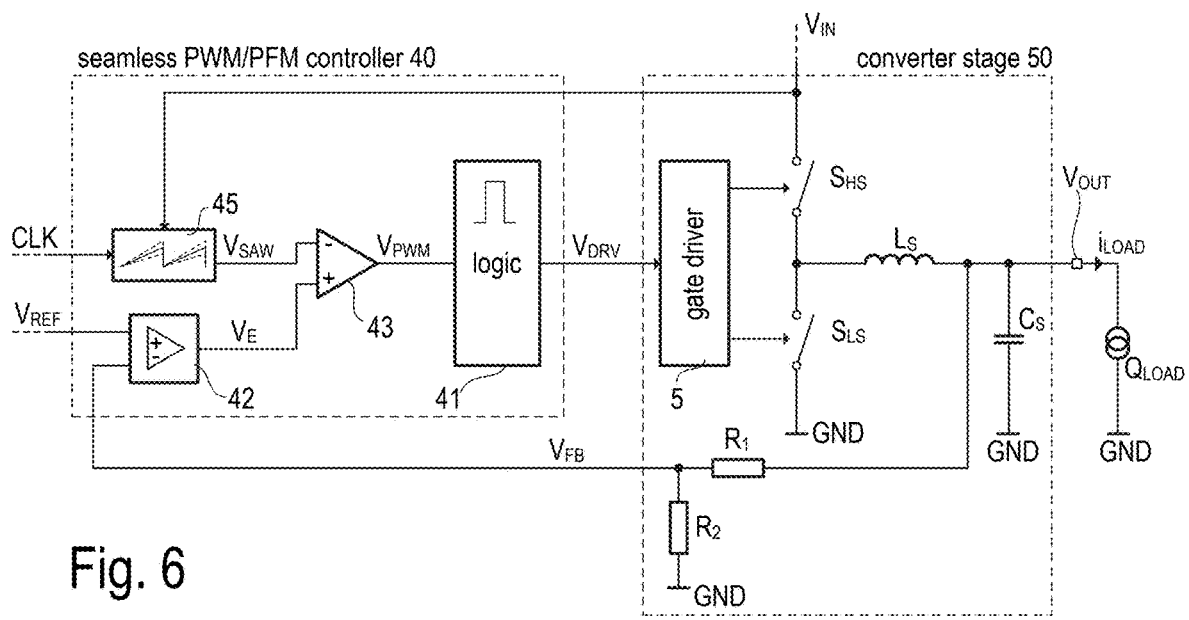
FIG. 6 illustrates a DC/DC converter with one example of an improved control circuit.

FIG. 6 illustrates a DC/DC converter with one example of an improved control circuit 40, which is a combined PWM/PFM controller that does not need a mode switch, and which provides a "seamless" transition between PWM DCM and PFM mode. Again, the converter stage 50 is the same as in the previous examples.

According to FIG. 6, the functionality of a PWM controller is basically provided by ramp generator 45 and comparator 43. The ramp generator 45 provides a triangular signal, such as a sawtooth signal $V_{SAW}$ with a frequency determined by the clock signal CLK. The repetitive ramp-shaped pulses, which compose the sawtooth signal, may have a constant steepness. However, in the depicted example, the steepness of the ramps depend on the level of the input voltage $V_{IN}$, wherein the steepness of the ramps and thus also the amplitude of the sawtooth signal increases as the input voltage $V_{IN}$ increases. The PWM signal $V_{PWM}$ is generated using the comparator 43 that compares the sawtooth signal $V_{SAW}$ and the error signal $V_E$ provided by an error amplifier 42. The error signal $V_E$ represents the deviation of the output voltage $V_{OUT}$ from a reference value, which is $V_{REF}(R_1+R_2)/R_2$ in the present example. The general function of an error amplifier and the voltage divider providing the feedback voltage $V_{FB}$ was already discussed with reference to FIG. 1 and is therefore not reiterated here. In one embodiment, the error amplifier 42 may have a high-pass characteristic in order to increase phase margin of the feedback loop (formed by the feedback of $V_{OUT}$ via signal $V_{FB}$).

It can be inferred from FIG. 6. that, the higher the level of the error signal $V_E$ is, the later (relative to the beginning of the current PWM cycle) the current ramp of the sawtooth signal $V_{SAW}$ will reach the level of the error signal $V_E$ and, consequently, the greater the duty cycle DS of the resulting PWM signal $V_{PWM}$ will be. In the event that—in one PWM cycle—the level of the error signal $V_E$ is negative, the comparator 43 will not create a pulse and the duty cycle is zero (in the current cycle), which leads to the mentioned Pulse Skipping.

In order to avoid very short pulses as shown in the right part of FIG. 2, particularly in PWM DCM pulse skipping mode, the logic circuit 41 is configured to augment the duty cycle in the event it is too low. That is, the drive signal $V_{DRV}$ generated by the logic circuit 41 and supplied to the gate driver 5 is basically identical with the PWM signal if the duty cycle of the PWM is above a reference duty cycle value (e.g. a minimum duty cycle value $DS_{MIN}$), whereas the duty cycle of drive signal $V_{DRV}$ is set to the reference/minimum duty cycle value $DS_{MIN}$ if the duty cycle of the PWM signal $V_{PWM}$ falls below a minimum value (e.g. the value $DS_{MIN}$). It is understood that the PWM signal $V_{PWM}$ is received by the logic circuit 41 and the drive signal $V_{DRV}$. In other words, the logic circuit 41 passes through the PWM signal $V_{PWM}$ while extending its duty cycle to the reference/minimum duty cycle value $DS_{MIN}$ if its current duty cycle is too small. The reference/minimum duty cycle value $DS_{MIN}$ (which corresponds to a minimum on-time) may be fixed or may vary dependent on the level of the input voltage $V_{IN}$.

Figure 7:
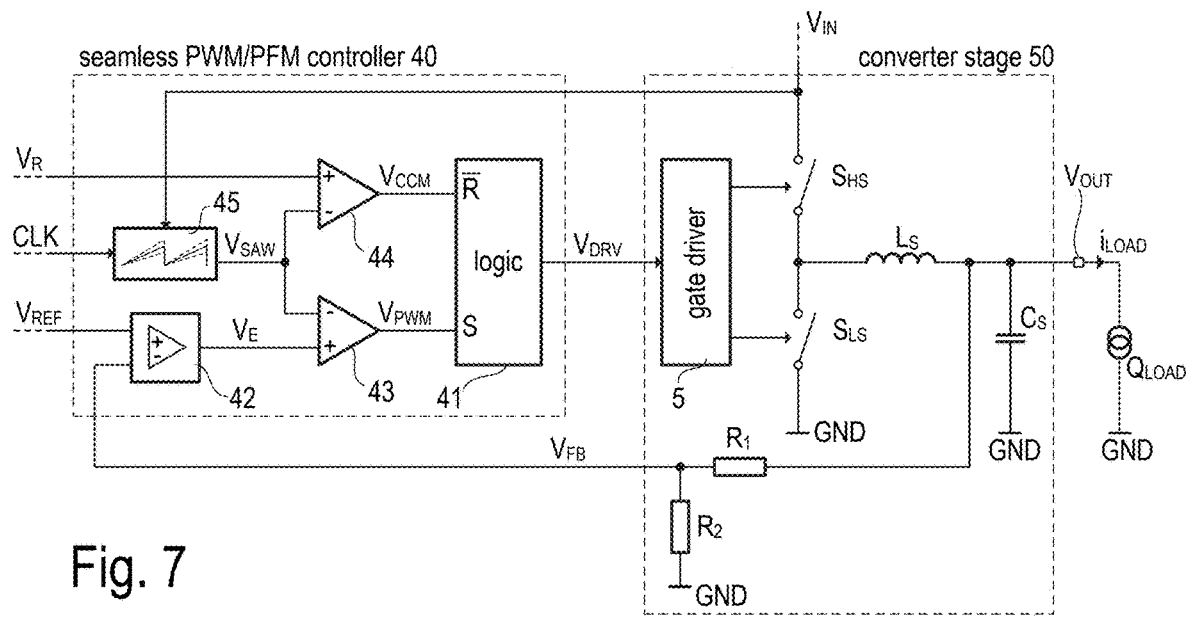
FIG. 7 illustrates one exemplary implementation of the control circuit of FIG. 6.

FIG. 7 illustrates one exemplary implementation of the control circuit 40 of FIG. 6. In particular, FIG. 7 illustrates how the above-mentioned minimum duty cycle value $DS_{MIN}$ is implemented. Accordingly, the minimum duty cycle value $DS_{MIN}$ is determined by the duty cycle of the signal $V_{CCM}$, which is generated by comparator 44, which is configured to compare the saw-tooth signal $V_{SAW}$ and a further reference voltage $V_R$ that may be set for a specific application. The on-time $T_{ON,min}$ of the signal $V_{CCM}$ is $V_R/k$ wherein k denotes the steepness of the ramps (assuming the ramps start at zero volts). In this example, the minimum duty cycle $DS_{min}$ is $T_{ON,min}/T_{CLK}$, wherein $T_{CLK}=f_{CLK}^{-1}$ denotes the period of the clock signal CLK and $f_{CLK}$ is the respective clock frequency. In accordance with one embodiment, the further reference voltage $V_R$ may be selected such that the resulting minimum duty cycle value $DS_{min}$ of the signal $V_{CCM}$ is equal to or larger than the ratio between output voltage $V_{OUT}$ and input voltage $V_{IN}$. The minimum duty cycle value $DS_{min}$ may be optimized for a specific application.

In the present example, the logic circuit 41 may be an RS-flip-flop with a dominant set input and in inverted reset input. Accordingly, the output of the logic circuit 41 (flip-flop) is set to a High Level upon detection of a High Level at the set input S, wherein a reset of the flip-flop is blocked as long as a High Level is applied to the set input (thus the name "set dominant" RS-flip-flop). The output of the logic circuit 41 (flip-flop) is reset to a Low Level upon detection of a Low Level at the (inverted) reset input $\overline{R}$ but not as long as a High Level is present at the set input S.

As a result, the output signal $V_{DRV}$ of the logic circuit 41 is synchronous and in phase with the signals $V_{CCM}$ and $V_{PWM}$. In each cycle, the on-time $T_{ON}$ of the pulses in the drive signal $V_{DRV}$ is the same as the on-time $T_{ON,PWM}$ of the PWM signal $V_{PWM}$ if $T_{ON,PWM}>T_{ON,min}$, wherein the lower bound of the $T_{ON}$ is $T_{ON,min}$. In other words, the on-time $T_{ON}$ of the pulses in the drive signal $V_{DRV}$ is given by $$T_{ON}=\max\{T_{ON,min},T_{ON,PWM}\}.$$

It is understood that each on-time can be converted into a duty cycle value by dividing it by the clock period $T_{CLK}$. Accordingly, the above equation can also be written as $$DS=\max\{DS_{min},DS_{PWM}\},$$

wherein $DS_{PWM}=T_{ON,PWM}/T_{CLK}$ and $DS_{min}=T_{ON,min}/T_{CLK}$.

Figure 8:
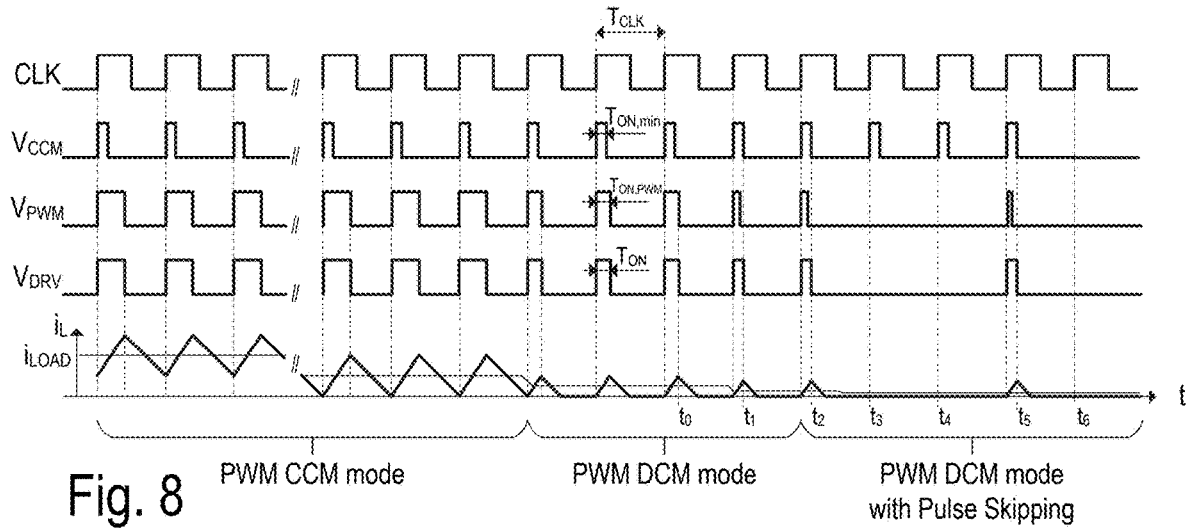
FIG. 8 includes timing diagrams illustrating the function of the circuit of FIG. 7.

The above explanations are further supported by the timing diagram of FIG. 8, which illustrates example waveforms of the signals CLK, $V_{CCM}$, $V_{PWM}$ and $V_{DRV}$. As can be seen from FIG. 8, as long as the on-time $T_{ON,PWM}$ (which equals duty cycle DS times clock period $T_{CLK}$) of the PWM signal $V_{PWM}$ is greater than the minimum on-time $T_{ON,min}$ (which is equal to the minimum duty cycle value $DS_{min}$ times the clock period $T_{CLK}$) of the signal $V_{CCM}$, the drive signal $V_{DRV}$ is basically the same as the PWM signal $V_{PWM}$. This is the case before time instant $t_1$ shown in FIG. 8. In the cycle starting at time $t_1$ the on-time $T_{ON,PWM}$ of the PWM signal $V_{PWM}$ is lower than the minimum on-time $T_{ON,min}$ due to the decreasing low load current. However, the logic circuit 41 ensures that the on-time $T_{ON}$ of the drive signal $V_{DRV}$ will not be lower than $T_{ON,min}$. As long as $T_{ON,PWM}<T_{ON,min}$ the duty cycle of the drive signal $V_{DRV}$ is set to $DS_{min}=T_{ON,min}\cdot T_{CLK}$. In the cycles starting at times $t_3$, $t_4$ and $t_6$ no pulse is generated due to Pulse Skipping as explained above.

Figure 9:
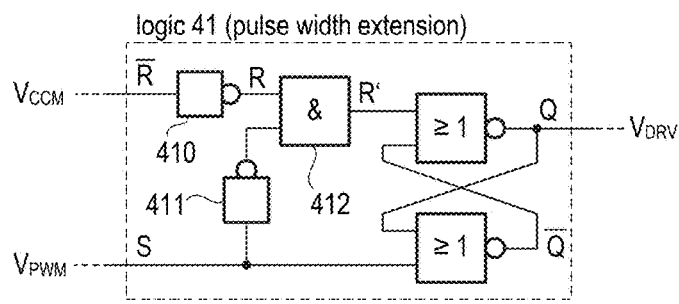
FIG. 9 illustrates one exemplary implementation of the logic circuit used in the control circuit of FIG. 8.

FIG. 9 illustrates one exemplary implementation of the logic circuit 41 shown in FIG. 7. Accordingly, the logic circuit 41 includes a normal RS-flip-flop composed of two NOR gates. The AND gate 412, in combination with the inverter 411, are configured to blank the reset signal R as long as a set signal S is active (i.e. has a High Level). The output of AND gate 412 is the modified reset signal R'. In summary, R'=R if S=Low (set input is inactive) whereas R'=0 if S=High (set input is active). The inverter 410 is configured to generate the reset signal R from the inverted reset signal $\overline{R}=V_{CCM}$ at the input of the logic circuit 41. Thus, the flip-flop is reset upon detection of a Low level in signal $V_{CCM}$ provided that the set signal $S=V_{PWM}$ has a Low level, and the flip-flop is set upon detection of a High level in signal $V_{PWM}$ (see also timing diagrams of FIG. 8).

It is understood, that the logic circuit 41 can be implemented in various different ways without changing its desired function. For example, the inverter 410 may be omitted if the inputs of the comparator 44 are interchanged, which will invert the comparator output signal thus making the inverter 410 superfluous. The skilled person will also recognize different possible ways of implementing the flip-flop, which may also be implemented using NAND gates, for example.

As discussed in detail above, the minimum on-time $T_{ON,min}$ and thus the minimum duty cycle $DS_{min}=T_{ON,min}\cdot f_{CLK}$ is determined by the steepness k of the ramps of the sawtooth signal and the voltage value $V_R$. In this example, the steepness of the ramps can be varied dependent on the input voltage level $V_{IN}$. It is understood that the minimum on-time $T_{ON,min}$ may be also determined by a different circuitry. Particularly when a fixed minimum on-time $T_{ON,min}$ is used, the logic circuit 41 may include, for example, a monoflop that is triggered by a High-Level of the PWM signal $V_{PWM}$ in each clock cycle. The length of the pulses provided by the monoflop may also be used to determine the minimum on-time $T_{ON,min}$. A skilled person may also consider using a monoflop with an adjustable pulse length to make the resulting minimum on-time $T_{ON,min}$ dependent on a parameter such as the input voltage value $V_{IN}$.

Various aspects of the embodiments described herein are summarized below. It is, however, understood that the following is not an exhaustive enumeration of technical features but merely an exemplary summary. The embodiments described herein relate to a DC/DC converter which may have a buck converter topology. In accordance with one embodiment, the DC/DC converter includes a converter stage (see FIGS. 6 and 7, buck converter stage 50) configured to receive an input voltage $V_{IN}$ and to generate an output voltage $V_{OUT}$ from the input voltage $V_{IN}$ in accordance with a modulated drive signal $V_{DRV}$ (on/off modulation). The converter stage 50 is further configured to provide a feedback signal representing the output voltage $V_{OUT}$ (see FIGS. 6 and 7, feedback voltage $V_{FB}$). The DC/DC converter further includes a controller circuit (see FIGS. 6 and 7, "seamless" PWM/PFM controller 40) that comprises an error amplifier configured to receive the feedback signal and a reference signal and to provide an error signal based on the feedback signal and the reference signal (see FIGS. 6 and 7, reference signal $V_{REF}$, error amplifier 42, error signal $V_E$). In one specific embodiment, the error amplifier may have a high-pass characteristic (and not an integrating characteristic as it is the case in some known approaches) to improve the phase margin.

The controller circuit further comprises a PWM modulator configured to receive a clock signal CLK and the error signal and to generate a PWM modulated signal based on the clock signal CLK and the error signal. In the examples shown in FIGS. 6 and 7 the PWM modulator is basically composed of the ramp generator 45 and the comparator 43. Moreover, the control circuit comprises a logic circuit (see FIGS. 6 and 7, logic 41) that is configured to receive the PWM signal and to generate therefrom the mentioned modulated drive signal for the converter stage based on the PWM signal so that—in each cycle of the clock signal CLK—the modulated drive signal has the same duty cycle as the PWM signal when the duty cycle (see FIG. 8, $T_{ON,PWM}/T_{CLK}$) of the PWM signal is not smaller than (i.e. greater than or equal to) a minimum duty cycle value (see FIG. 8, $T_{ON,min}/T_{CLK}$).

When the duty cycle of the PWM signal is smaller than the minimum duty cycle value, the modulated drive signal has a duty cycle corresponding to the minimum duty cycle value. In some embodiments, the minimum duty cycle may be adjustable, for example, dependent on the input voltage $V_{IN}$.

The PWM modulator (cf. FIGS. 6 and 7, ramp generator 45 and comparator 44) is configured to generate the PWM signal so that it includes consecutive pulses in synchronization with the clock signal and—in each cycle of the clock signal CLK—the pulse width is determined by the error signal (and depends on the ramp steepness as explained above). An error signal level that is below a certain threshold (which may be zero volts) results in a pulse width of zero, i.e. an omission of the pulse.

In one embodiment, the ramp generator is configured to receive a signal indicative of the input voltage and to generate the ramp signal with an amplitude dependent on the input voltage. As the frequency is determined by the clock signal, an increased amplitude necessarily results in an increased ramp steepness.

In one embodiment, the logic circuit receives a further modulated signal (see FIG. 7, signal $V_{CCM}$) which is a PWM signal synchronous to the clock signal CLK and has a duty cycle corresponding to the minimum duty cycle value (see FIG. 8, $DS_{min}=T_{ON,min}/T_{CLK}$). A second comparator (FIG. 7, logic 41) is configured to compare the ramp signal and the further reference voltage (see FIG. 7, voltage $V_R$) and to provide the further modulated signal as an output signal. Accordingly, in this example the minimum duty cycle value is determined by the steepness of the ramps and the further reference voltage.

The logic circuit may, in accordance with one embodiment, be configured to set the drive signal to a High level upon detection of the PWM signal having a High level, and reset the drive signal to a Low level upon detection that the modulated signal has a Low level or after a given (minimum) on-time has lapsed, whatever occurs later. This function may be achieved using a set dominant RS flip-flop with some additional circuitry as shown in FIG. 7.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

What is claimed is:

1. A DC/DC converter circuit comprising:
   a converter stage configured to receive an input voltage and to provide an output voltage from the input voltage in accordance with a modulated drive signal, the converter stage being further configured to provide a feedback voltage representing the output voltage; and
   a controller circuit comprising:
   an error amplifier configured to receive the feedback voltage and a reference voltage and to provide an error signal based on the feedback voltage and the reference voltage;
   a PWM modulator configured to receive a clock signal and the error signal and to generate a modulated signal based on the clock signal and the error signal; and
   a logic circuit configured to receive the modulated signal and to generate the modulated drive signal for the converter stage based on the modulated signal so that, in each cycle of the clock signal, the modulated drive signal has a same duty cycle as the modulated signal when a duty cycle of the modulated signal is not smaller than a minimum duty cycle value, wherein the logic circuit includes an RS flip-flop which is configured to be set in response to a High level of the modulated signal, and be reset either in response to a Low level of the modulated signal or after a given on-time has lapsed, whatever occurs later.

2. The DC/DC converter circuit of claim 1,
wherein the modulated drive signal has a duty cycle corresponding to the minimum duty cycle value when the duty cycle of the modulated signal is smaller than the minimum duty cycle value.

3. The DC/DC converter circuit of claim 1,
wherein the minimum duty cycle value is adjustable.

4. The DC/DC converter circuit of claim 3,
wherein the minimum duty cycle value depends on the input voltage.

5. The DC/DC converter circuit of claim 1,
wherein the PWM modulator is configured to generate the modulated signal so that it includes consecutive pulses in synchronization with the clock signal and, in each cycle of the clock signal, a pulse width is determined by the error signal.

6. The DC/DC converter circuit of claim 1,
wherein the PWM modulator includes a ramp generator configured to generate a ramp signal including consecutive ramps in synchronization with the clock signal; and
a first comparator configured to compare the ramp signal and the error signal and to provide the modulated signal as an output signal.

7. The DC/DC converter circuit of claim 6,
wherein the ramp generator is configured to receive a signal indicative of the input voltage and to generate the ramp signal with an amplitude dependent on the input voltage.

8. The DC/DC converter circuit of claim 6, further comprising:
a second comparator configured to compare the ramp signal and a further reference voltage and to provide a further modulated signal as an output signal, the minimum duty cycle value depending on a steepness of the ramp signal and the further reference voltage.

9. The DC/DC converter circuit of claim 1,
wherein the logic circuit receives a further modulated signal which is a PWM signal synchronous to the clock signal and has a duty cycle corresponding to the minimum duty cycle value.

10. The DC/DC converter circuit of claim 1, wherein the logic circuit is configured to:
set the modulated drive signal to a High level upon detection of the modulated signal having a High level, and
reset the modulated drive signal to a Low level upon detection of the modulated signal having a Low level or after a given on-time has lapsed whatever occurs later.

11. The DC/DC converter circuit of claim 1, wherein the minimum duty cycle value is equal to or larger than a ratio between the output voltage and the input voltage.

12. The DC/DC converter circuit of claim 1,
wherein the converter stage is a buck converter stage.

13. The DC/DC converter circuit of claim 1,
wherein the error amplifier has a high pass characteristic.

14. A DC/DC converter circuit comprising:
a converter stage configured to receive an input voltage and to provide an output voltage from the input voltage in accordance with a modulated drive signal, the converter stage being further configured to provide a feedback voltage representing the output voltage; and
a controller circuit comprising:
an error amplifier configured to receive the feedback voltage and a reference voltage and to provide an error signal based on the feedback voltage and the reference voltage;
a PWM modulator configured to receive a clock signal and the error signal and to generate a modulated signal based on the clock signal and the error signal; and
a logic circuit configured to receive the modulated signal and to generate the modulated drive signal for the converter stage based on the modulated signal so that, in each cycle of the clock signal, the modulated drive signal has a same duty cycle as the modulated signal when a duty cycle of the modulated signal is not smaller than a minimum duty cycle value, wherein the logic circuit includes an RS flip-flop which is configured to set the modulated drive signal to a High level upon detection of the modulated signal having a High level, and reset the modulated drive signal to a Low level upon detection that the modulated signal has a Low level or after a minimum on-time has lapsed, whatever occurs later.

15. The DC/DC converter circuit of claim 14,
wherein the modulated drive signal has a duty cycle corresponding to the minimum duty cycle value when the duty cycle of the modulated signal is smaller than the minimum duty cycle value.

16. The DC/DC converter circuit of claim 14,
wherein the minimum duty cycle value is adjustable.

17. The DC/DC converter circuit of claim 14,
wherein the minimum duty cycle value depends on the input voltage.

18. A DC/DC converter circuit comprising:
a converter stage configured to receive an input voltage and to provide an output voltage from the input voltage in accordance with a modulated drive signal, the converter stage being further configured to provide a feedback voltage representing the output voltage; and
a controller circuit comprising:
an error amplifier configured to receive the feedback voltage and a reference voltage and to provide an error signal based on the feedback voltage and the reference voltage;
a PWM modulator configured to receive a clock signal and the error signal and to generate a modulated signal based on the clock signal and the error signal; and
an RS flip-flop configured to receive the modulated signal and to generate the modulated drive signal for the converter stage based on the modulated signal so that, in each cycle of the clock signal, the modulated drive signal has a same duty cycle as the modulated signal when a duty cycle of the modulated signal is not smaller than a minimum duty cycle value.

19. The DC/DC converter circuit of claim 18,
wherein the modulated drive signal has a duty cycle corresponding to the minimum duty cycle value when the duty cycle of the modulated signal is smaller than the minimum duty cycle value.

20. The DC/DC converter circuit of claim 18,
wherein the minimum duty cycle value is adjustable.

\* \* \* \* \*